United States Patent
Kataoka

(10) Patent No.: US 7,154,208 B2
(45) Date of Patent: Dec. 26, 2006

(54) CONTROL APPARATUS FOR VIBRATION TYPE ACTUATOR

(75) Inventor: Kenichi Kataoka, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 124 days.

(21) Appl. No.: 10/156,056

(22) Filed: May 29, 2002

(65) Prior Publication Data

US 2002/0180387 A1 Dec. 5, 2002

(30) Foreign Application Priority Data

Jun. 1, 2001 (JP) .................... 2001-167091

(51) Int. Cl.
*H01L 41/06* (2006.01)

(52) U.S. Cl. ............ 310/317; 310/316.01; 310/316.02

(58) Field of Classification Search ............ 310/317, 310/316.01, 316.02, 325
See application file for complete search history.

(56) References Cited

U.S. PATENT DOCUMENTS

| | | | | |
|---|---|---|---|---|
| 5,001,404 A | | 3/1991 | Kataoka ............ 318/116 |
| 5,004,964 A | | 4/1991 | Kataoka et al. ............ 318/128 |
| 5,157,300 A | | 10/1992 | Kataoka et al. ............ 310/323 |
| 5,285,134 A | | 2/1994 | Kataoka ............ 318/116 |
| 5,436,521 A | | 7/1995 | Kataoka ............ 310/317 |
| 5,442,251 A | * | 8/1995 | Kaida et al. ............ 310/321 |
| 5,459,370 A | | 10/1995 | Kataoka ............ 310/317 |
| 5,473,214 A | * | 12/1995 | Hildebrand ............ 310/321 |
| 5,477,100 A | * | 12/1995 | Kataoka ............ 310/323.03 |
| 5,539,268 A | | 7/1996 | Kataoka ............ 310/316 |
| 5,606,214 A | * | 2/1997 | Corsaro ............ 310/329 |
| 5,631,516 A | | 5/1997 | Kataoka ............ 310/316 |
| 5,932,952 A | * | 8/1999 | Takagi ............ 310/323.02 |
| 5,939,851 A | | 8/1999 | Kataoka et al. ............ 318/611 |
| 6,031,316 A | | 2/2000 | Kataoka ............ 310/316 |
| 6,049,156 A | | 4/2000 | Yamamoto et al. .... 310/316.01 |
| 6,054,795 A | | 4/2000 | Yamamoto et al. .... 310/316.01 |
| 6,084,334 A | | 7/2000 | Yamamoto et al. .... 310/316.01 |
| 6,100,622 A | | 8/2000 | Yamamoto et al. .... 310/316.01 |
| 6,177,753 B1 | * | 1/2001 | Atsuta ............ 310/316.01 |
| 6,313,564 B1 | | 11/2001 | Kataoka et al. ........ 310/316.01 |
| 6,376,965 B1 | | 4/2002 | Kataoka et al. ............ 310/317 |
| 6,609,985 B1 | * | 8/2003 | Todd et al. .................. 474/109 |

FOREIGN PATENT DOCUMENTS

| | | |
|---|---|---|
| JP | 63-209478 | 8/1988 |
| JP | 2-206373 | 8/1990 |

* cited by examiner

*Primary Examiner*—Darren Schuberg
*Assistant Examiner*—J. Aguirrechea
(74) *Attorney, Agent, or Firm*—Fitzpatrick, Cella, Harper & Scinto

(57) ABSTRACT

The present invention relates to apparatus achieving improvement in operation characteristics in the operation of stopping or reversing the direction of or decelerating movement of a vibrating wave actuator constructed to apply an alternating voltage to an electro-mechanical energy conversion element to vibrate a vibration member to obtain a driving force. In the operation of stopping the vibrating wave actuator, it is necessary to cancel the vibration to stop the actuator, in order to stop the actuator in good response. The present invention has achieved the above object by applying an excitation signal, which excites vibration in a direction to cancel free vibration in the vibration member, to the electro-mechanical energy conversion element in the stop operation or the like.

1 Claim, 12 Drawing Sheets

CONTROL APPARATUS FOR VIBRATION TYPE ACTUATOR

BACKGROUND OF THE INVENTION

Field of the Invention

The present invention relates to control apparatus for a vibration type actuator.

In general, a vibration type actuator, such as a vibrating wave motor or the like, has a vibration member in which driving vibration is generated, and a contact member in press contact with the vibration member; the driving vibration generated in the vibration member causes relative movement between the vibration member and the contact member.

The vibration member typically is composed of an elastic member and a piezoelectric element, which functions as an electro-mechanical energy conversion element. For example, piezoelectric elements with driving phases placed at positions with a spatial phase difference of 90° relative to the elastic member may be configured so that alternating signals of two phases with a phase difference of 90° may be applied to the two driving phases so as to form respective bending vibrations on the elastic member. In this manner a traveling wave is generated in the vibration member by composition of these bending vibrations, and the contact body pressed against the vibration member is driven with a driving force by frictional contact therebetween.

A frictional material for obtaining the appropriate frictional force is bonded, applied, or formed on contact portions of the vibration member and the contact member.

The elastic member forming the vibration member is made of a material such as aluminum or the like, having a poor vibration damping property, i.e., a material resistant to damping of vibration.

In a vibration type actuator of this type, a variety of control operations can be implemented by altering the phase difference between the alternating signals of the two phases applied.

In the control apparatus for the vibration type actuator described in Japanese Patent Application Laid-Open No. 63-209478, the driving voltages applied in a stop operation are reversed in phase (forwarded or retarded by 180°) to hasten the stop operation. In the control apparatus for the vibration type actuator described in Japanese Patent Application Laid-Open No. 2-206373, voltages in a phase relation to reverse the rotation in the stop operation are applied to hasten the stop operation.

SUMMARY OF THE INVENTION

An object of the invention associated with the present application is to provide control apparatus for a vibration type actuator capable of securely imparting sufficient vibration damping to the vibration member in a stop operation or in a reversing operation.

In one aspect, the present invention is a control apparatus for a vibration type actuator including a contact member is in press contact with a vibration member having an electro-mechanical energy conversion element, and in which a driving alternating signal is applied to the electro-mechanical energy conversion element so as to generate a driving vibration in the vibration member, thereby effecting relative movement between the vibration member and the contact member;

the control apparatus comprises a control circuit which applies an excitation signal, which excites vibration in a direction so as to cancel free vibration in the vibration member, to the electro-mechanical energy conversion element during an operation of decelerating or reversing or stopping a relative movement between the vibration member and the contact member.

Other objects of the present invention will become clearer from the following embodiments thereof described with reference to the drawings.

DESCRIPTION OF THE PREFERRED EMBODIMENTS

The embodiments of the present invention will be described below on the basis of the drawings.

(First Embodiment)

Figure 1:
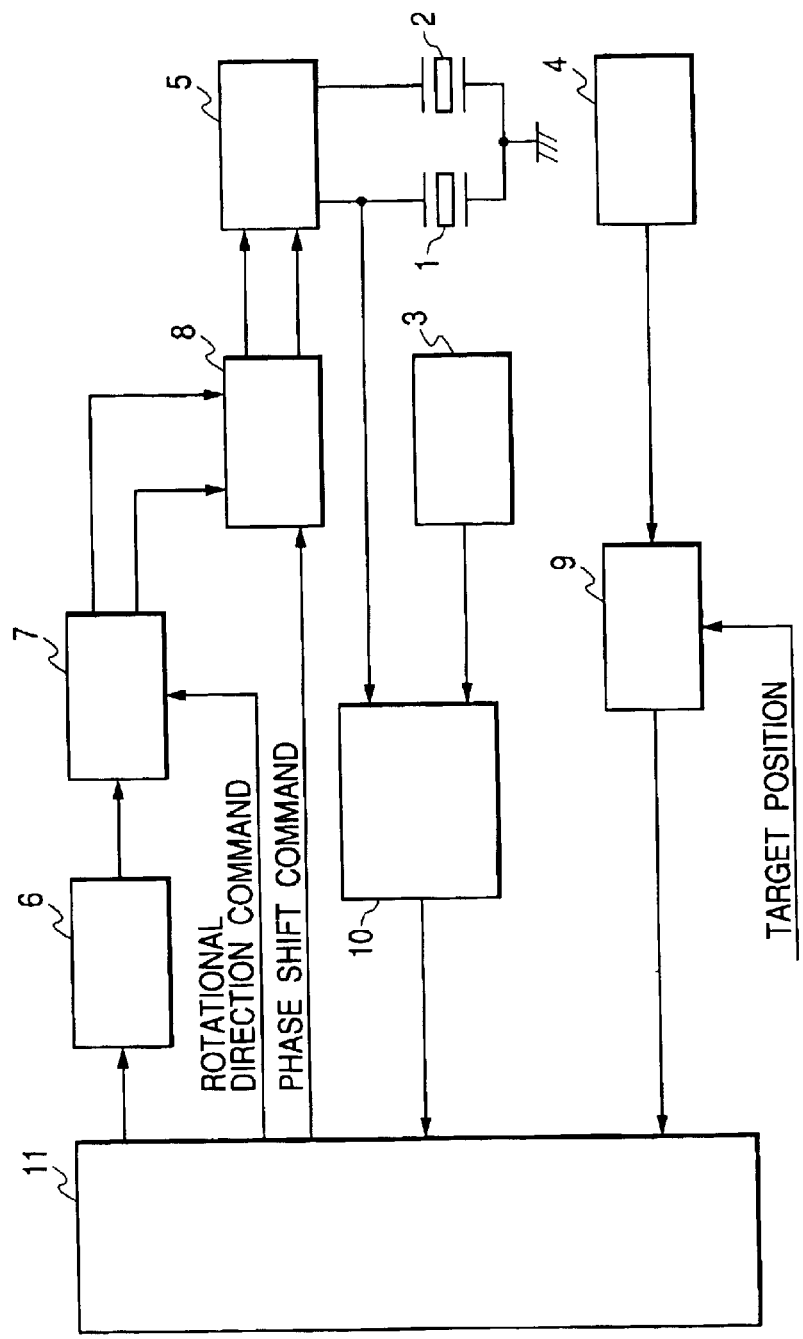
FIG. 1 is a block diagram showing the first embodiment.

FIG. 1 is a block diagram showing the first embodiment of the present invention.

Figure 14:
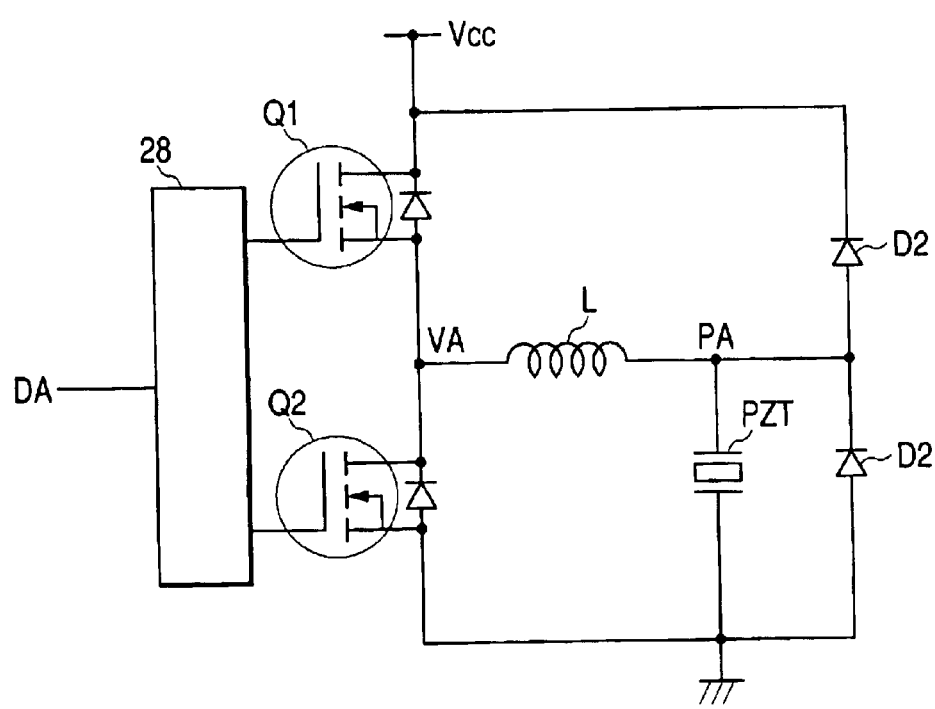
FIG. 14 is a diagram showing a circuit configuration of power amplifying means in the first embodiment.

In FIG. 1, numerals 1 and 2 designate piezoelectric elements which are bonded to an elastic member (not shown) which vibrates, for example, a ring-shaped vibration member, when AC voltages (alternating signals) are applied thereto. One piezoelectric element 1 and the other piezoelectric element 2 are located, for example, with a positional phase difference of $\lambda/4$, where $\lambda$ is the wavelength at the resonance frequency. In each of the piezoelectric elements 1, 2, a plurality of regions with alternately varying polarization directions are formed, for example, at intervals of $\lambda/2$, and electrodes are formed in the respective regions. An electrode is formed over the entire surface on the other side. Numeral 3 denotes vibration detecting means for detecting vibration generated in the vibration member; the vibration detecting means may be selected from a piezoelectric element, a strain gage, a magnetostriction element, an optical sensor using a laser, and the like. Numeral 4 designates position detecting means for detecting the position of a moving member (not shown) which is moved by the vibration generated in the vibration member; numeral 5 designates power amplifying means which supplies the AC voltages with respective phase differences of 90° from each other, to the piezoelectric elements 1, 2; numeral 6 designates an oscillator; numeral 7 designates driving signal generating means which divides an output signal from the oscillator 6 and outputs pulse signals of two phases; and numeral 8 designates phase shift means which shifts the phases of the two-phase pulse signals from the driving signal generating means 7 in an identical phase direction by a phase shift amount according to a command from CPU 11 described hereinafter. An example of the power amplifying means 5 is presented in FIG. 14. Numeral 28 designates a MOSFET driver which controls gate-terminal voltages of MOSFETs of Q1 and Q2 according to a signal DA, which is a pulse signal supplied from the phase shift means 8, and which normally amplifies the signal DA with the amplitude of not more than 5 V to a pulse signal VA with the amplitude of the power-supply voltage Vcc. The waveform of the signal VA is dulled by inductance L and clipped at the power-supply voltage Vcc and at the GND potential by diodes D1, D2, whereby a signal PA comes to have a signal waveform of trapezoidal shape and is applied to the piezoelectric element(s) PZT. The reason why the signal is clipped by the diodes in this way is as follows: in an ordinary system, without the diodes, energy stored in the inductor might obstruct high-speed change of the phase of the signal PA, and for this reason, high-speed change of the phase of the signal PA is made feasible by flowing the energy of the inductor to the diodes in the present example.

Numeral 9 denotes position comparing means which compares the output of the position detecting means 4 with a position command from target position setting means (not shown); numeral 10 designates phase difference detecting means which detects a phase difference between the phase of the driving voltage and the phase of the signal output from the vibration detecting means; and the CPU 11 issues a command of a phase shift amount to the phase shift means 8 on the basis of the results of the output from the phase difference detecting means 10 and the position comparing means 9.

Figure 2:
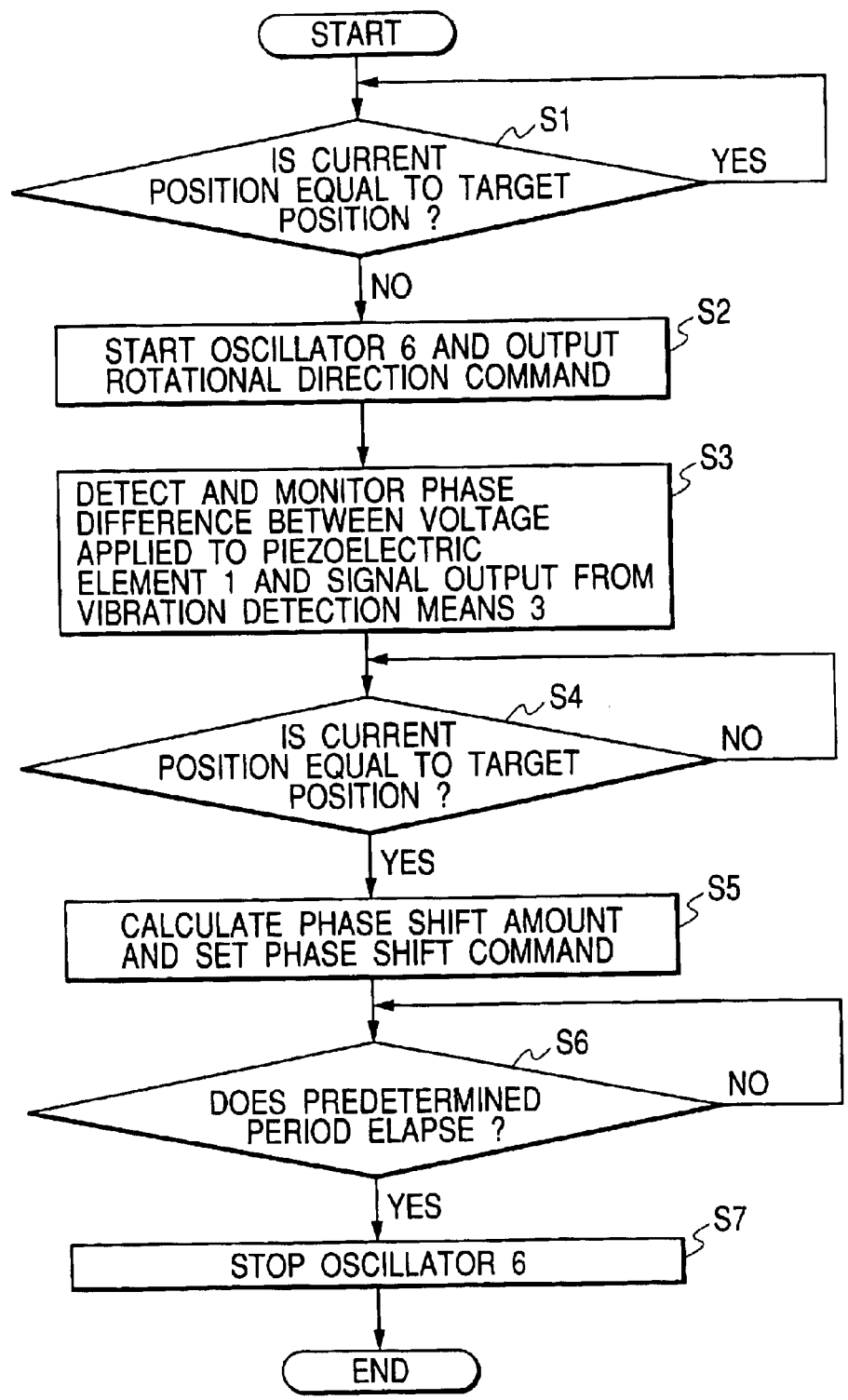
FIG. 2 is a flowchart showing the operation of the first embodiment.

FIG. 2 is a flowchart showing the operation of the CPU 11.

At the first step the position comparing means 9 compares the information on the position of the moving member (current position) from the position detecting means 4 with the target position from the unrepresented command means (S1). When the result of the comparison is no agreement between them, the CPU sends a start command to the oscillator 6 and outputs a rotational direction command to the driving signal generating means 7 (S2).

Then the driving signal generating means 7 divides the output frequency of the oscillator 6 to generate pulse signals of a predetermined frequency and two phases different 90° from each other. Since no phase shift command is issued, the pulse signals are passed without any shift through the phase shift means 8 and boosted by the power amplifying means 5 to be applied to the piezoelectric elements 1, 2.

Then the vibration member excited by the piezoelectric elements 1, 2 starts vibrating, whereby the moving member starts moving. The position detecting means 4 monitors the position of the moving member and the position comparing means 9 compares the position of the moving member with the target position. This state is maintained until the position of the moving member comes to agree with the target position.

On that occasion, the phase difference detecting means 10 continuously detects and monitors the phase difference between the voltage applied to the piezoelectric element 1 and the signal output from the vibration detecting means 3 detecting the vibration of the unrepresented vibration member (S3). When the position of the moving member comes to agree with the target position (S4), operation of the CPU moves to S5.

When the position of the moving member agrees with the target position, the CPU calculates a phase shift amount so as to give a lag of 90° to the phase of the voltage applied to the piezoelectric element 1, relative to the phase of the output signal of the vibration detecting means 3 on the basis of the result of the detection of the phase difference at the phase difference detecting means 10, and outputs a phase shift command to the phase shift means 8 (S5).

It is configured that this state is maintained for a fixed period of time (S6) and the CPU issues a command to stop oscillation to the oscillator 6 (S7).

The period before the stop of oscillation was the fixed period herein, but it may be a time proportional to a speed immediately before the stop operation (or immediately before arrival at the target position), detected through the use of the position detecting means 4 or an unrepresented speed detecting means or the like, or a time corresponding to the speed.

The following will describe how the phase of the voltage relative to the phase of the vibration acts on damping of actual vibration.

The vibration displacement of the vibration member can be quickly damped by supplying a force in a direction to cancel the velocity of the mass point of the vibration member. When the motion of the mass point is represented by $\sin(\omega t)$, the velocity of the mass point is given by the derivative thereof, $\cos(\omega t)$. For decelerating the mass point by applying an acceleration in the direction to reduce the velocity of the mass point, it is necessary to supply a force with a phase shift of 180° relative to the phase of the velocity of the mass point.

Accordingly, the deceleration can be implemented by supplying the force with the phase represented by $-\cos(\omega t)$. This force indicates a force with the phase lagging $\sin(\omega t)$ by 90°.

In other words, the cancellation of vibration can be implemented by superimposing the vibration of the opposite phase over the vibration of the vibration member. In this case, since the vibration to cancel the vibration of the vibration member is of the phase lagging 180° behind the phase of the vibration and since the free vibration lags the force by 90° in phase, the force for generating the signal with the phase lag of 180° needs to have the phase leading the phase of the vibration generated to cancel the vibration, by 90°; that is, the vibration can be damped by applying a force with a phase lag of 90° behind the phase of the vibration of the vibration member.

Namely, the free vibration refers to a state of vibration without any periodical force acting on the vibration member. In this state the vibration member vibrates at the resonance frequency, which is determined by the shape of the vibration member, the pressed condition thereof, and so on. If at this frequency an external force is exerted on the vibration member the phase of motion of the vibration member lags the external force by 90°.

In order to cancel the vibration, a vibration with a phase lag of 180° behind the phase of the vibration of the vibration member is superimposed on the vibration of the vibration member. Therefore, the vibration can be canceled when a signal with a lag of 90° behind the phase of the exciting force is equal to a signal with a lag of 180° behind the phase of the vibration of the vibration member. Thus, to apply an exciting force with a phase lead of 90° (because the vibration lags the excitation by 90°) ahead a vibration generated for the cancellation operation (a vibration with a phase lag of 180° behind the vibration of the vibration member) is to apply an exciting force with a phase lead of 90° ahead of the vibration lagging the vibration of the vibration member by 180°. Namely, the vibration can be damped by applying an exciting force with a phase lag of 90° behind the vibration of the vibration member.

Figure 3:
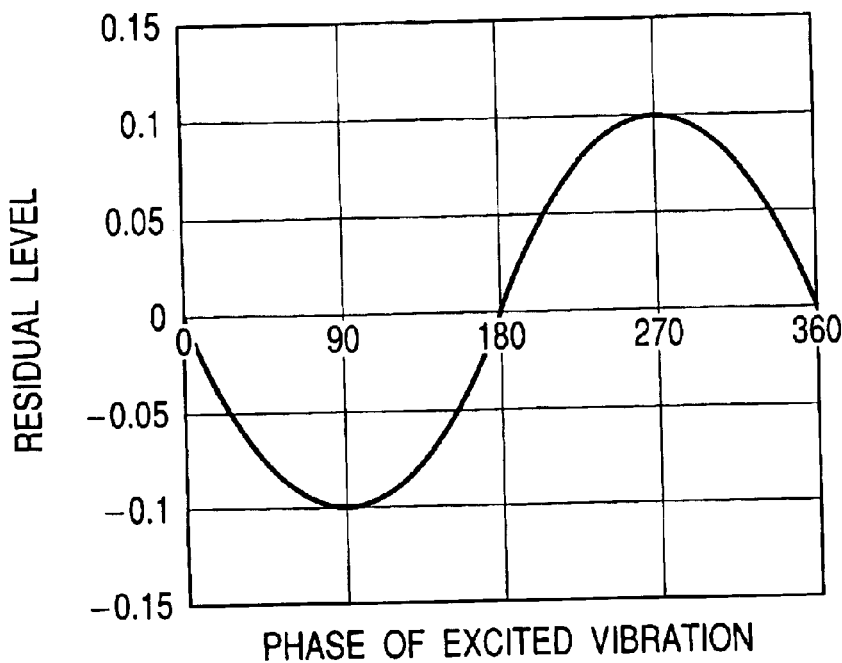
FIG. 3 is a graph showing the excitation phase and the level of residual amplitude in the case of weak exciting force.
Figure 4:
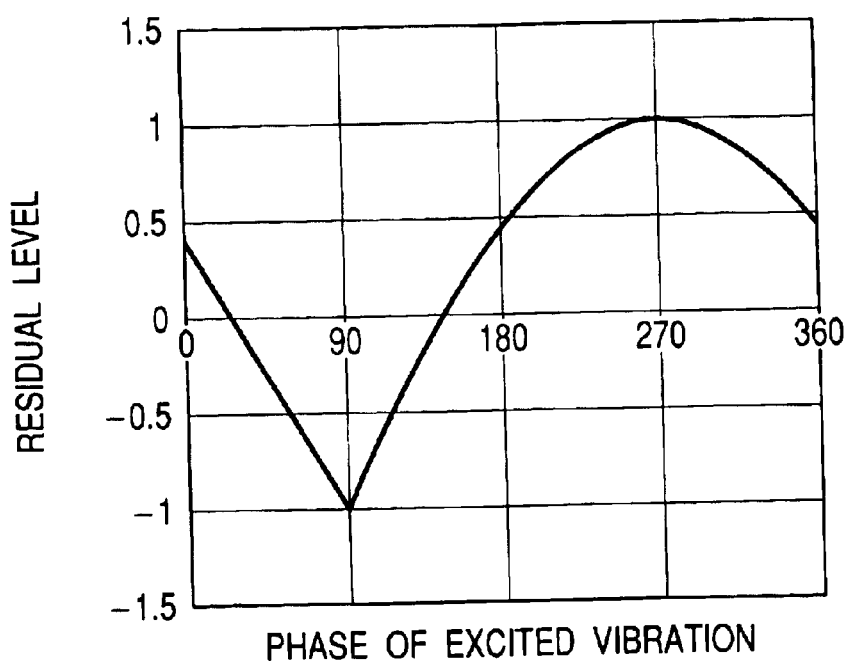
FIG. 4 is a graph showing the excitation phase and the level of residual amplitude in the case of strong exciting force.

FIGS. 3 and 4 show the degree of damping of the vibration of the vibration member against the phase difference (which is negative when the excitation lags) between the phase of the vibration of the vibration member and the phase of the excitation applied in order to damp the vibration forcedly.

The negative domain indicates that the amplitude of the vibration is damped, and 0 indicates no damping.

FIG. 3 shows a case of a weak exciting force for damping the vibration, in which the vibration is damped in the range where the lag of the excitation phase is greater than 0° and smaller than 180°.

FIG. 4 shows a relation in the fastest damping case. It is seen that the damping is largest when the phase of the exciting force lags the phase of the vibration of the vibration member by 90°.

Since the damping is substantially determined by the phase as described above, the manner of damping can be arbitrarily controlled by changing the phase.

FIG. 4 shows the fastest case of damping. The level of damping is −1 at the delay of 90°, which indicates that the vibration is terminated by single excitation (excitation of a half period). In the case of FIG. 4, different from the characteristics of FIG. 3, it is shown that the vibration can be damped only within the range of 30° to 150°. In both cases (FIGS. 3 and 4), the vibration exhibits the maximum increase at the delay of 270° (i.e., at the lead of 90°).

It is seen from the above discussion that, for damping the vibration, it is necessary at least to supply the exciting force with the phase lag of more than 0° and less than 180° relative to the phase of the vibration of the vibration member; otherwise the vibration is not damped, that, for excitation with a force to damp the vibration faster, it is necessary to apply an exciting force with a phase lag of more than 30° and less than 150° relative to the phase of the vibration of the vibration member, and that, for damping the vibration fastest, it is necessary to apply an exciting force with a phase lag of 90° relative to the phase of the vibration of the vibration member.

In the operation of reversing the moving direction of the moving member, an acceleration operation is carried out using the applied voltages in the phases in the reversing operation, instead of the stop operation in which the oscillator 6 was finally stopped in the present embodiment.

Figure 15:
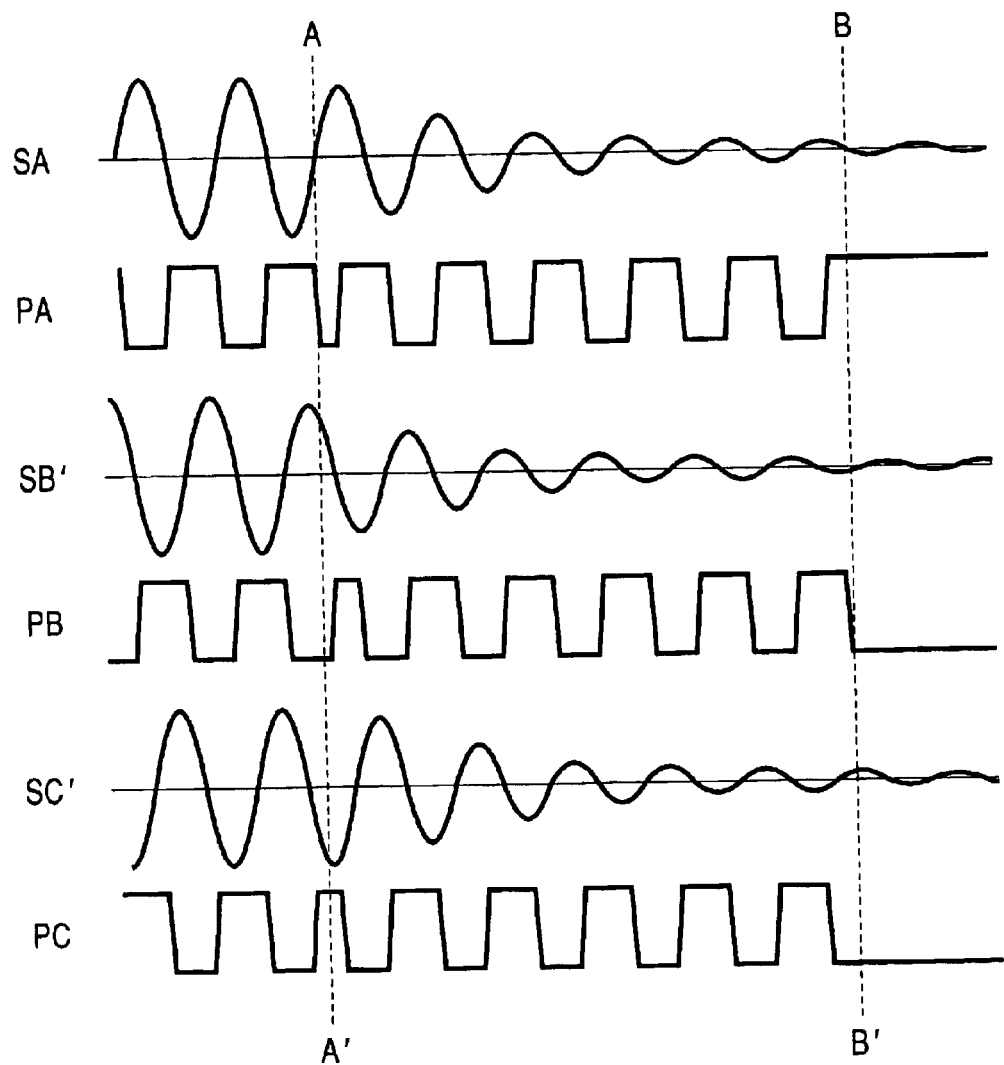
FIG. 15 is a timing chart showing waveforms in three-phase driving in the first embodiment.

The present embodiment described a vibration type actuator operating with AC voltages of two phases, but it is clear that a like effect can be achieved with the use of AC voltages of three or more phases. The following will briefly describe the vibration type actuator driven in three phases. In the above-described example the vibration type actuator was one wherein two or more vibrations were generated at different positions or in different vibration modes by AC voltages of two phases with a phase difference of 90°, they were combined to create elliptic vibration at a contact portion with the moving member, and the elliptic vibration caused relative motion between the vibration member and the moving member. In contrast, in a three-phase driving operation, three or more vibrations are generated at different positions or in different vibration modes by AC voltages of three phases, for example, with a phase difference of 120° between them, to effect relative motion between the vibration member and the moving member. FIG. 15 is a timing chart showing the relationship between the vibrating state of standing vibration and applied voltage corresponding to each of the phases in the operation of stopping vibration in a vibration type actuator in the case of three-phase driving. A signal SA is an output signal from a vibration detecting sensor provided in the three-phase driving vibration type actuator, and signals SB' and SC' represent vibration detection signals expected to be detected by vibration detecting sensors if they are given. Since a processing circuit will become complicated if the vibration detecting sensors are provided for the all three phases, only one phase is detected to set the phase of the applied voltage signal PA and the phases of signals PB and PC being applied voltages of the other driving phases are generated on the basis of the signal PA. It is shown that by this method the standing vibrations corresponding to the phases without the vibration detecting sensors are also damped similarly as the signal SA is. The signals PA, PB, PC have waveforms of trapezoidal shape and the phase difference between the signals is 120°. Before the time A–A', the phase difference is approximately 180° between the signal PA, PB, PC and the signal SA, SB', SC' indicating the vibrating state in each phase of the vibration member in the vibration type actuator, which indicates a state in which the vibration frequency of the vibration member is sufficiently higher than the resonance frequency of the vibration member and in which the velocity of relative motion between the vibration member and the moving member in contact therewith is sufficiently low. At the time A–A', the stop operation of vibration is started. After the time A–A', the signals PA, PB, PC are voltages with the phase lead of about 90° relative to the phases of the applied voltages before the time A-A'. They have a phase lag of 90° relative to the phases of the signals SA, SB', SC', indicating the vibrating states in the respective phases of the vibration member in the vibration type actuator. This results in quickly damping the amplitude of the vibration in each phase. It is then detected at the time B–B' that the amplitude of the vibration becomes sufficiently small, and the applied voltages PA, PB, PC thereafter are maintained in the state at the time B–B'. In the technology heretofore, it was common practice to employ the method of bringing the applied voltages into 0 V or into an open state in the stop operation or the method of setting only the driver side of the inductor at 0 V, but the impact due to the final setting to 0 V was exerted on PZT to cause excess vibration in certain cases. However, it becomes feasible to stop the vibration quickly, by fixing the applied voltages last as shown in FIG. 15. The power supply may be considered to be finally turned off in order to reduce power consumption, but the power-supply voltage is normally not instantaneously converged to 0 V upon interruption of power supply. Therefore, impact is little on the PZT, so as to cause no problem.

When the vibration of the vibration member is quickly switched from progressive vibration to standing vibration by the operation of quickly damping the vibration in some phases in out of plural phases of AC voltages, it is feasible to prevent production of big slip sound or deterioration of the frictional surfaces even with occurrence of sudden high load.

It is assumed that the vibration detecting means used in the present embodiment detects the independent standing waves generated by the excitation from the respective piezoelectric elements 1, 2 individually or from only one of them. In the case where the resultant vibration of these standing waves is detected, the phase of the resultant vibration is invariant if the exciting forces in the stop operation are applied so as to damp the respective standing waves at an equal damping speed. Therefore, the phases of vibration of the respective standing waves can be readily detected from the phase of the resultant vibration, and thus it is not always necessary to detect the vibrations of the individual standing waves.

Namely, positional phase shifts from the excited portions can be given by preliminarily measuring the individual phases of the output signals from the vibration detecting means 3 against the excitation voltages at the resonance frequency, and thus the phases of the vibrations of the standing waves can be calculated from the detection signal of the resultant vibration by subtracting the phases preliminarily measured and stored in a memory, from the detected phase. In the case where the AC voltages applied to the piezoelectric elements 1, 2 are superimposed on the detection signal from the vibration detecting means 3, it is clear that the phases of standing waves are calculated by subtracting the AC voltages from the detection signal or that the excitation phases in the stop operation can be determined in consideration of the phase shifts in the superimposed case.

If the output of the vibration detecting means 3 is inverted or is passed through a filter, the phase thereof will be shifted from the actual vibration phase. In these cases, it is clear that the phases of the AC voltages for the damping of vibration can be determined in consideration of the phase shift due to this filter.

(Second Embodiment)

Figure 5:
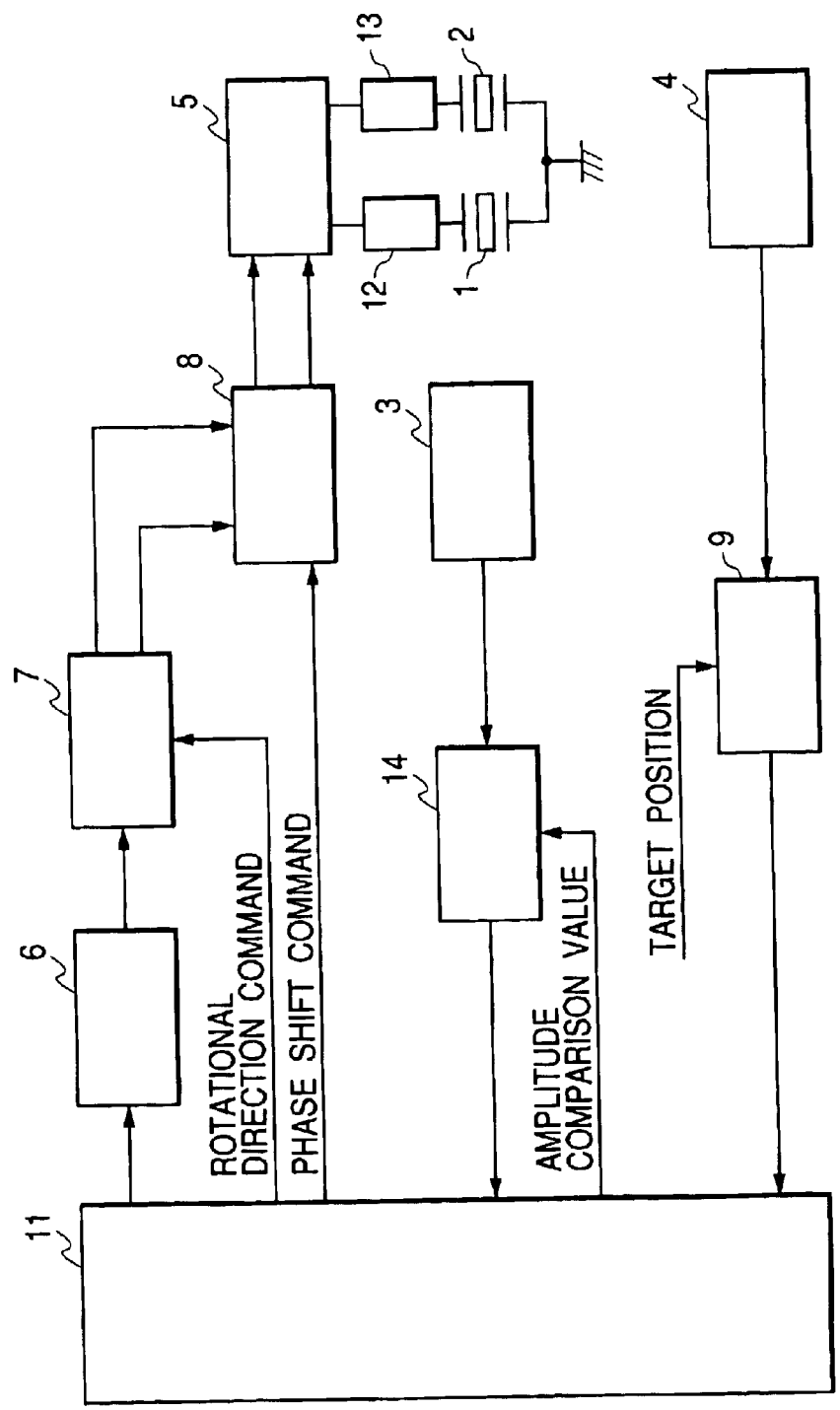
FIG. 5 is a block diagram showing the second embodiment.

FIG. 5 is a block diagram showing the second embodiment.

In FIG. 5, numerals 12 and 13 designate inductor elements, such as coils, transformers, or the like, intended to supply AC voltages to the piezoelectric elements 1, 2 by dulling and boosting waveforms of AC voltages of pulse shape output from the power amplifying means 5; and numeral 14 designates amplitude comparing means which outputs the result of comparison between the amplitude of the output signal from the vibration detecting means 3 and a comparison value from the CPU 11. The vibration detecting means 3 stated herein may provide any value as long as it is a value corresponding to the amplitude of the vibration of the vibration member. For example, it can be an effective value, a mean value, a peak-to-peak value, a pulse width of a pulse signal obtained as a result of comparison of a vibration signal with a predetermined value, or the like.

Figure 6:
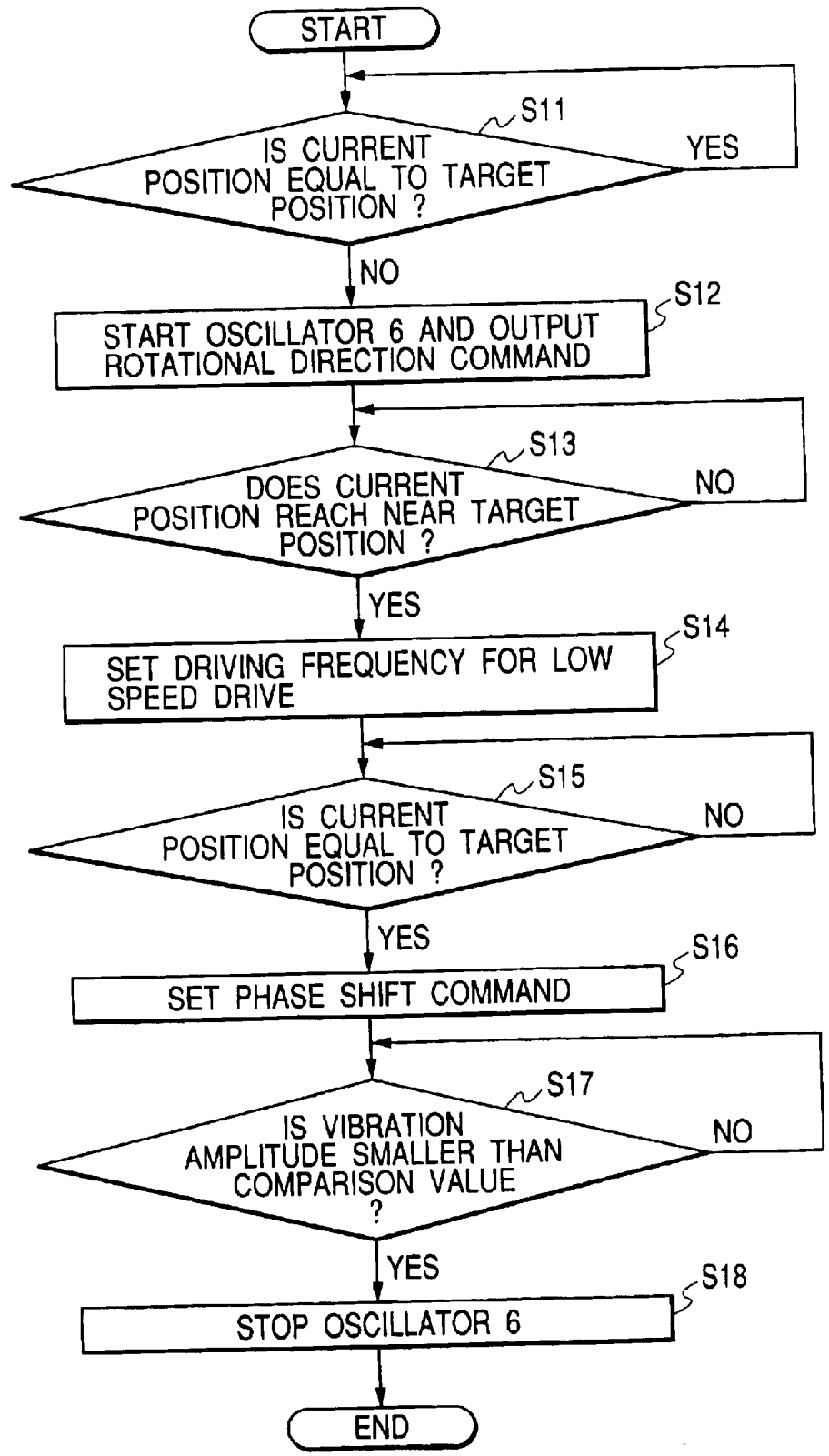
FIG. 6 is a flowchart showing the operation of the second embodiment.

FIG. 6 is a flowchart showing the operation of the CPU 11.

At the first step the position comparing means 9 compares the information on the position of the moving member from the position detecting means 4 with the target position from the unrepresented command means (S11). When the current position does not agree with the target position, the CPU sends a start command to the oscillator 6 and outputs a rotational direction command to the driving signal generating means 7 (S12).

The driving signal generating means 7 divides the output frequency of the oscillator 6 to generate pulse signals of two phases with a phase difference of 90° at a predetermined frequency. Since there is no phase shift command issued, the pulse signals passing without any shift through the phase shift means 8 are boosted by the power amplifying means 5 to be applied to the piezoelectric elements 1, 2. Then the vibration member excited by the piezoelectric elements 1, 2 starts vibrating, whereby the moving member starts moving.

The position detecting means 4 monitors the position of the moving member and the position comparing means 9 compares the current position with the target position (S13). Then the CPU waits until the moving member arrives near the target position. When the current position becomes close to the target position, the driving frequency is set at a frequency for low speed drive (S14).

On that occasion, the driving frequency is normally set at a predetermined frequency higher than the resonance frequency or set so as to be gradually shifted to the higher frequency side and be swept up to a predetermined frequency.

Then this state is maintained until the position of the moving member agrees with the target position. When the position of the moving member reaches the target position (S15), the CPU sends a phase shift command to advance the phase of the voltage applied to the piezoelectric element 1 by 90°, to the phase shift means 8 (S16). In this state the amplitude comparing means 14 compares the amplitude of the output signal from the vibration detecting means 3 with the comparison value from the CPU 11 (S17). After the amplitude is detected becoming smaller than the comparison value, i.e., after the vibration of the vibration member is judged as sufficiently damped, the CPU sends a command to stop the oscillation, to the oscillator 6 (S18).

In the first embodiment the phase was set so as to lag the vibration of the piezoelectric element 1, whereas in the present embodiment the phase of the AC voltage is given a lead of 90°, the reason for which will be described below.

Figure 7:
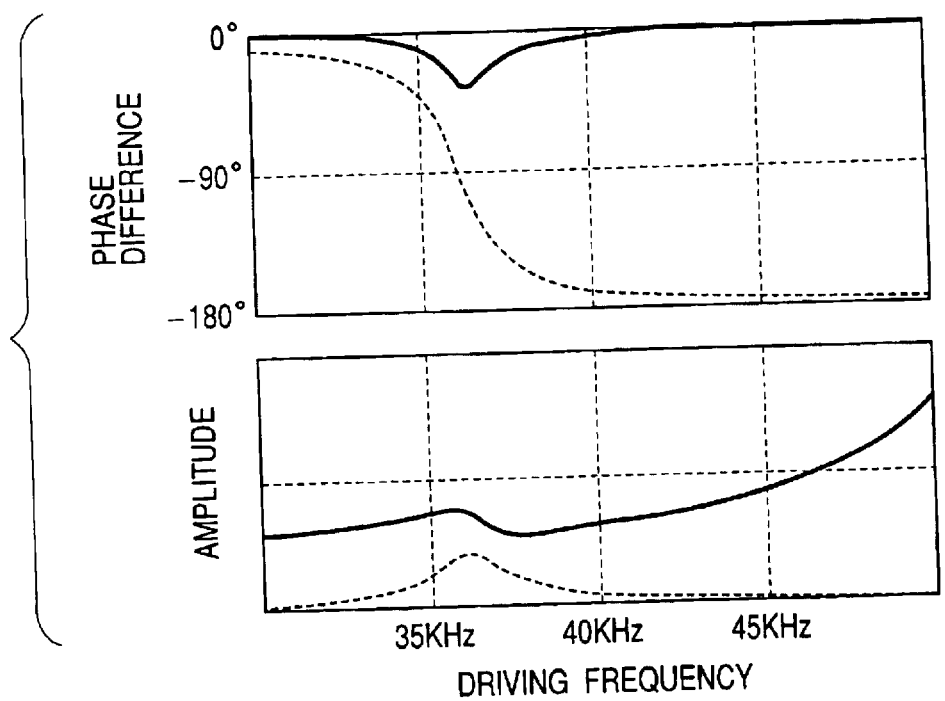
FIG. 7 is a graph showing the frequency characteristics of voltages applied to the vibration member and vibration of the vibration member.

FIG. 7 is a Bode diagram showing the frequency characteristics of the driving voltage and actual vibration. Solid lines represent the characteristics of the voltages applied to the piezoelectric elements against the output voltage of the power amplifying means 5, and dashed lines the characteristics of the vibration of the piezoelectric elements against the driving voltage.

The voltages applied to the piezoelectric elements 1, 2, indicated by the solid lines, have a phase lag at the resonance frequency (near 36 kHz) of the vibration member because of the influence of the inductor elements 12, 13, but there is almost no lag near 40 kHz, above the resonance frequency.

As is apparent from the characteristics of the amplitude of the vibration of the piezoelectric elements indicated by the dashed line, the amplitude of the vibration is large around the resonance frequency of the vibration member, and decreases as the frequency increases or decreases.

Accordingly, in order to move the position of the moving member quickly to the target position, it is necessary that the frequency of the AC voltages applied to the piezoelectric elements 1, 2 be set as close to the resonance frequency as possible to move the moving member at high speeds and that, in order to stop the moving member at the target position with high accuracy, the frequency of the AC voltages be set apart from the resonance frequency to stop the vibration after damped sufficiently.

In the case of the present embodiment, since the frequency of the AC voltages is set on the higher side, higher than the resonance frequency, the vibration characteristics of the piezoelectric elements 1, 2 have a phase lag of 90° behind the applied voltages at the resonance frequency, but the phase difference is approximately 180° near the target position, because the frequency near the target position is set higher than the resonance frequency in order to get ready for the stop operation.

Accordingly, in the first embodiment, the optimal phase of the exciting force for the stop operation of vibration was a phase with a phase lag of 90° behind the phase of the vibration. When this is applied to the present embodiment, since the vibration of the vibration member lags 180° behind the applied voltages near the target position, it becomes feasible to implement a quick stop operation by applying an exciting force with a phase lag of 270° further lagging the vibration by 90°, i.e., by exerting an exciting force with a phase lead of 90° relative to the applied voltages.

In the present embodiment the oscillator 6 was stopped when the amplitude of the variation of the vibration member became smaller than the predetermined amplitude, but the oscillator 6 may also be stopped when change in the output from the position detecting means 4 comes to fall within a predetermined range.

The present embodiment used the position detecting means 4, but it is also possible to employ a configuration wherein there is provided a velocity detecting means for detecting the velocity of the moving member and the oscillator 6 is stopped when the velocity of the moving member becomes smaller than a predetermined value.

For reversing the moving direction of the moving member, it can be implemented by performing an acceleration operation using the phases of the applied voltages for the reversing operation, instead of the stop operation of the oscillator 6 carried out in the above embodiment.

The following problem can be circumvented by carrying out the vibration damping operation after achievement of sufficient deceleration as in the present embodiment described above. It is a phenomenon becoming serious, particularly, in the case of the quick stop operation, which is residual vibration after the relative motion between the moving member and the vibration member is stopped to unite the moving member and the vibration member. It is vibration at the natural frequency determined by the rigidity of an unrepresented support member supporting the moving member or the vibration member and the weight of the moving member and the vibration member, and the remaining time of this vibration becomes longer as the impact upon the stop operation increases.

Namely, supposing that the vibration member is supported on a stationary member by springs, when the moving member is quickly stopped from a moving state at a high speed, a relative force acts between the vibration member and the moving member, so that the springs supporting the vibration member are displaced to induce vibration due to the total mass of the vibration member and the moving member, and the springs. Since the relative force occurring between the moving member and the vibration member is smaller in the quick vibration damping operation after sufficient damping of the vibration of the vibration member than in the damping operation on the way of the high-speed operation, the remaining time of vibration becomes shorter.

In the present embodiment the moving velocity was decreased by setting the driving frequency at a frequency higher than the resonance frequency, but the moving velocity can also be decreased by setting the driving frequency conversely at a frequency lower than the resonance frequency. In this case, since the phase of the vibration of the vibration member becomes closer to the phase of the applied voltages, the way of shifting the phase in the stop operation is different from that in the case of a frequency higher than the resonance frequency. In this case, since the phase of the vibration of the vibration member becomes close to 0° relative to the phase of the applied voltages, the phase of the applied voltages is given a lag of 90° relative to the phase of the applied voltages immediately before the start of the stop operation.

(Third Embodiment)

Figure 8:
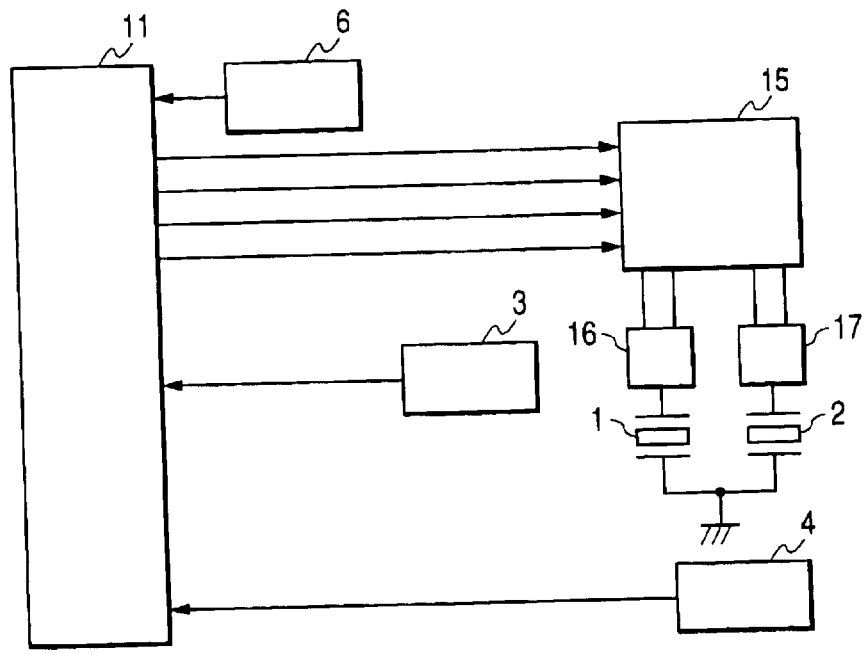
FIG. 8 is a block diagram showing the third embodiment.

FIG. 8 is a block diagram showing the third embodiment of the present invention.

In FIG. 8, numeral 15 designates power amplifying means which amplifies pulse signals of four phases output by making use of a timer function of the CPU 11, and numerals 16 and 17 designate transformers, to the primary side of each of which the opposite phases out of the four-phase output voltages from the power amplifying means 15 are connected. High AC voltages of two phases are generated on the secondary side of the transformers to be applied to the piezoelectric elements 1, 2.

The frequency of the AC voltages is set by a frequency dividing rate which is set in a programmable frequency divider in the CPU 11 to divide a pulse signal of several ten MHz from the oscillator 6 with enhanced stability, for example, through the use of a quartz oscillator, and the pulse width of the output signal from the CPU 11 is set by counting the time corresponding to the pulse width by a timer. In the first embodiment described above the oscillator 6 was stopped to stop the driving voltages, whereas in the present embodiment the oscillator 6 always oscillates after supply of power, and in the stop operation the pulses of four phases output from the CPU 11 are kept all at the same level.

By keeping the pulses of four phases all at the same level, it is assumed that drivers are connected in the push-pull configuration to the primary side of the transformers, and it is meant that the voltages between the two terminals on the primary side are set equal in the stop operation.

The amplitude of the voltages applied to the piezoelectric elements 1, 2 can be changed by changing the pulse width, whereby the exciting force in the stop operation can be set at an arbitrary value. In the second embodiment described above the amplitude comparing means 14 and the position comparing means 9 performed the comparison operations of amplitude and position, whereas in the present embodiment such data is read into the CPU 11 and the comparisons are made by software.

Figure 9:
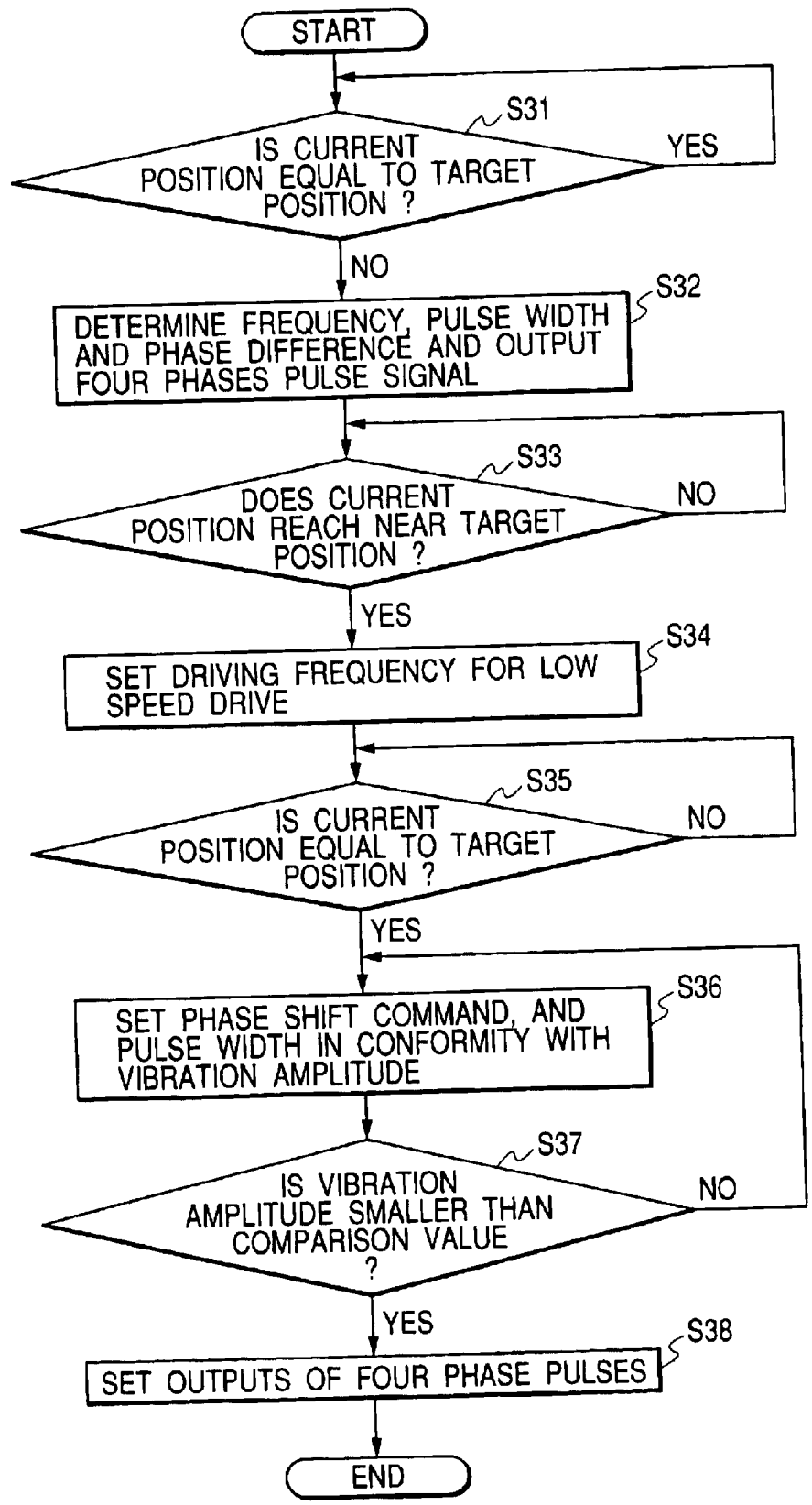
FIG. 9 is a flowchart showing the operation of the third embodiment.

FIG. 9 is a flowchart showing the operation of the CPU 11.

At the first step the information on the position of the moving member from the position detecting means 4 is compared with the target position from the unrepresented command means (S31). When the current position is not equal to the target position, the CPU determines the frequency, the pulse width, and the phase difference and outputs the pulse signals of four phases (S32). This phase difference is a value determined according to the moving direction. The four-phase pulse signals are pulse signals with phase intervals of 90°, and the four-phase pulse signals are boosted by the power amplifying means 15 to be applied to the piezoelectric elements 1, 2.

Then the vibration member excited by the piezoelectric elements 1, 2 starts vibrating, whereby the moving member starts moving. The position of the moving member is monitored by the position detecting means 4 and is compared with the target position (S33). Then the CPU waits until the moving member arrives near the target position. When the moving member arrives near the target position, the driving frequency is set to a frequency for low speed drive (S34).

On that occasion, the driving frequency is normally set at a predetermined frequency higher than the resonance frequency or set so as to be gradually shifted to the high frequency side and swept up to a predetermined frequency.

Then this state is maintained until the position of the moving member agrees with the target position (S35). When the position of the moving member reaches the target position, the internal timer in the CPU 11 is set so as to advance the phase of the voltage applied to the piezoelectric element 1 by 90° (S36). The AC voltages with a phase lead of 90° are applied until the amplitude detected by the vibration detecting means 3 becomes smaller than the predetermined amplitude. When the amplitude reaches the predetermined amplitude (S37), the outputs of the four-phase pulse signals are fixed at the same level (S38), whereby the voltages applied to the piezoelectric elements 1, 2 are set to 0.

The amplitude of the AC voltages with a phase lead of 90° is configured to be set according to the amplitude of the vibration of the vibration member being the output from the vibration detecting means 3, which can be implemented by changing the pulse width of the four-phase pulse signals output from the CPU 11.

Concerning in what relation the pulse width is set with the amplitude of the vibration of the vibration member, the pulse width can be set, for example, as a value proportional to the amplitude of the vibration or a result of addition of a predetermined value to the value proportional to the amplitude of the vibration.

The pulse width of the four-phase pulse signals may also be set in such a way that a target damping curve is first set for the amplitude of the vibration, the actual amplitude of vibration is compared with the curve, and the pulse width is determined based on the result of the comparison (e.g., based on a value of integration of the comparison result).

How to change the pulse width can be a method of changing the pulse width on the basis of a predetermined pattern according to the amplitude of the vibration of the vibration member immediately before the start of the stop operation or according to the velocity immediately before the start of the stop operation of the moving member moved by the vibration of the vibration member. For example, the greater the amplitude of the vibration or the higher the velocity, the longer the time for the stop operation of the vibration of the vibration member. Therefore, it is necessary to set an amount of change of the pulse width per unit time.

In the present embodiment the damping speed of the vibration of the vibration member was changed by changing the amplitude of the AC voltages applied to the piezoelectric elements 1, 2, because the amplitude of the voltages was proportional to the exciting force. It is also possible to change the damping speed of the vibration of the vibration member similarly by changing the phases of the exciting AC voltages relative to the phase of the vibration of the vibration member, as shown in FIGS. 3 and 4.

In the case of the phase difference, the phase for maximum damping is 90°, and any desired damping can be achieved by shifting the phase from 90°.

Accordingly, the damping speed of vibration can also be controlled similarly by changing the phases of the four-phase pulse signals instead of the pulse width in the present embodiment.

The above described the stop operation, and the following will describe the operation of reversing the moving direction of the moving member.

In the reversing operation, the four-phase pulse signals are output according to a procedure similar to that in the above description, the four-phase pulse signals are set so as to be in a phase relation to reverse the moving direction, instead of fixing the outputs of the four-phase pulse signals, and the frequency and pulse width are changed according to a predetermined operation to accelerate the moving speed.

In the present embodiment the pulse width was changed to change the amplitude of the applied voltages, but the same can be implemented by changing the power-supply voltage, the amplification rate, etc. of the power amplifying means 5.

In the present embodiment the amplitude of the voltages was changed to change the exciting force, but a like effect can also be attained by a configuration wherein the exciting force is intermittently applied and time intervals and excitation durations for application of the exciting force are used as parameters, whereby a time-averaged value of the exciting force can be changed based on the parameters even at the same applied voltages.

(Fourth Embodiment)

Figure 10:
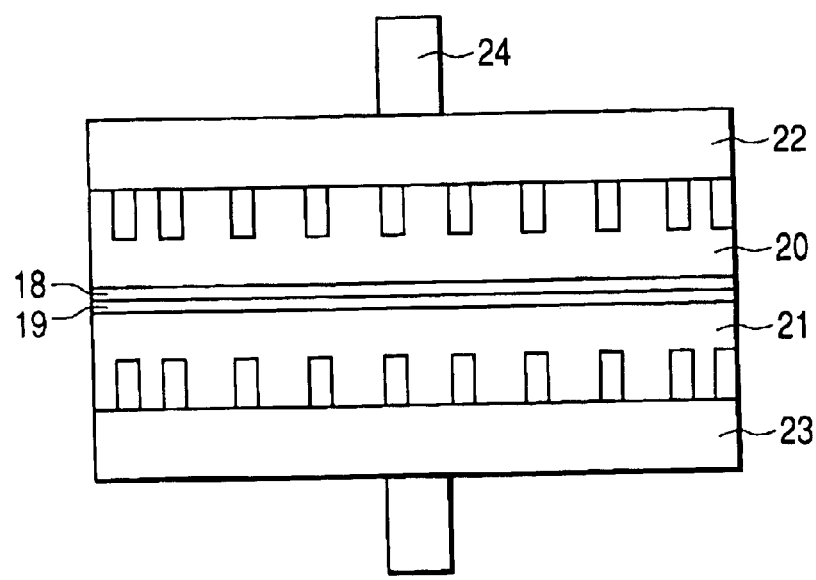
FIG. 10 is an illustration showing the structure of the vibration type actuator in the fourth embodiment.

FIG. 10 is an illustration showing the structure of the vibration type actuator used in the fourth embodiment of the present invention.

In FIG. 10, numerals 18 and 19 designate piezoelectric elements, and numerals 20 and 21 designate vibration members. AC voltages from AC voltage supply means (not shown) are applied to the piezoelectric elements 18 and 19 to excite vibration in the vibration members 20, 21. Numerals 22 and 23 denote moving members kept in press contact with the vibration members 20, 21 by pressing members (not shown), and 24 designates a rotational shaft which is coupled to the moving members 22, 23.

When the rotational shaft is coupled to the moving members driven by a plurality of vibration members in this way, if the vibration members provide respective outputs of different tendencies to the rotational shaft 24, there will arise a problem of degrading the total efficiency.

Since the two moving members 22, 23 are coupled by the rotational shaft 24, if there remains vibration of the vibration member 21 even after a stop of the vibration of the vibration member 20, an extra time will be taken for the stop of the moving members 22, 23 and the moving member 22 will slip on the vibration member 20 to raise a problem of deteriorating the frictional surfaces.

In order to make both vibration members 20, 21 draw the same vibration damping curve in the stop operation of the vibration members 20, 21, the phase and amplitude of the AC voltages are changed in a predetermined pattern on the piezoelectric elements 18, 19 and thereafter the supply of the AC voltages is stopped, thereby stopping the vibration quickly and preventing deterioration of the frictional surfaces.

(Fifth Embodiment)

Figure 11:
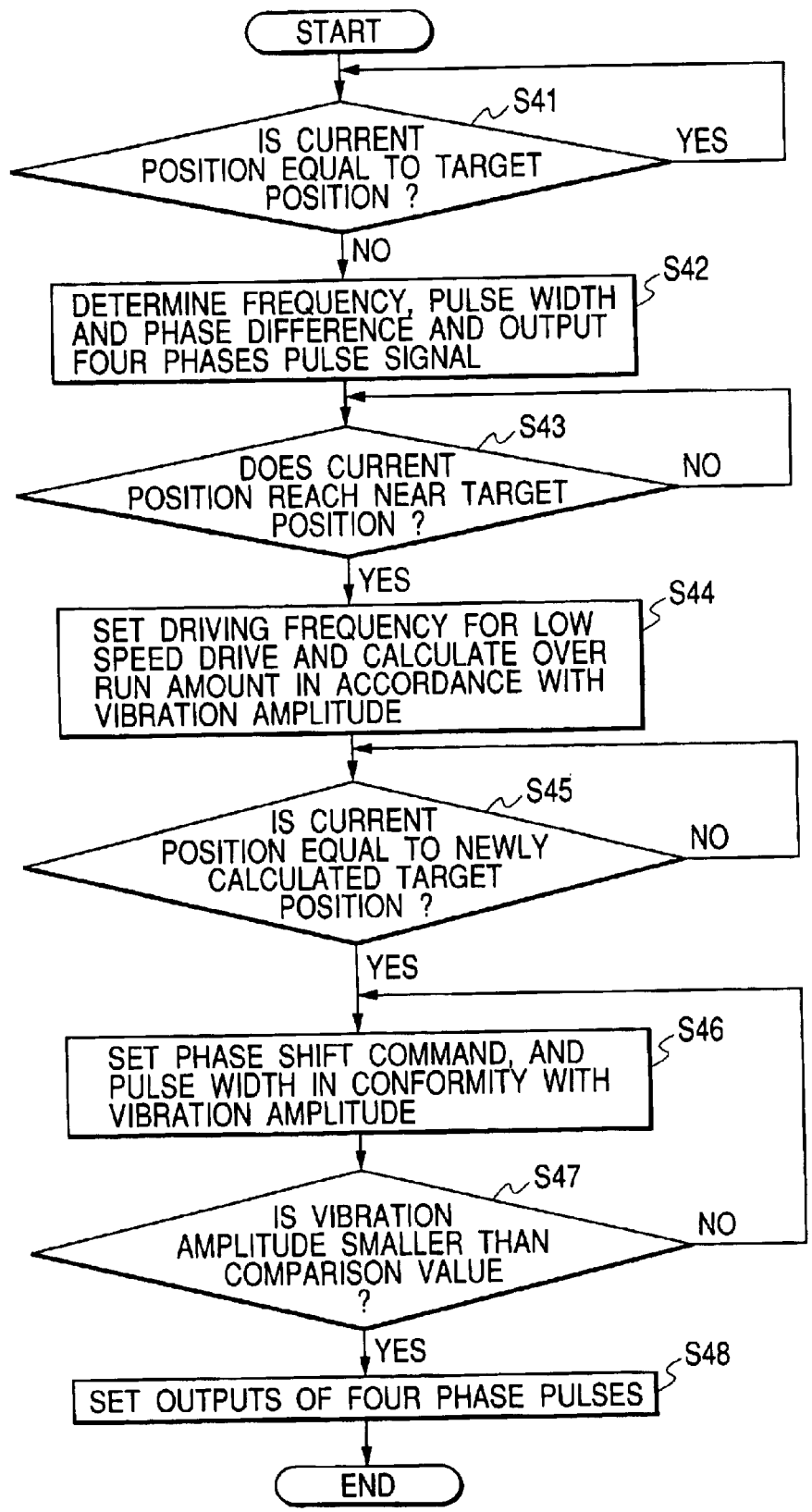
FIG. 11 is a flowchart showing the operation of the fifth embodiment.

FIG. 11 is a flowchart showing the operation of the CPU 11 in the fifth embodiment of the present invention. The block configuration in the present embodiment is the same as in FIG. 8 and illustration thereof is thus omitted herein.

In the present embodiment, in the stop operation an overrun amount at a stop operation is calculated from the amplitude of the vibration immediately before a start of the stop operation and the stop operation is started from the overrun amount before the target position.

At the first step the information on the position of the moving member from the position detecting means 4 is compared with the target position from unrepresented command means (S41). When the current position of the moving member does not agree with the target position, the CPU determines the frequency, the pulse width, and the phase difference and outputs the pulse signals of four phases (S42).

The four-phase pulse signals are boosted by the power amplifying means 15 to be applied to the piezoelectric elements 1, 2. Then the unrepresented vibration member excited by the piezoelectric elements 1, 2 starts vibrating, whereby the moving member starts moving. The position detecting means 4 monitors the position of the moving member and the current position of the moving member is compared with the target position (S43). Then the CPU waits until the moving member arrives near the target position. When the moving member arrives near the target position, the CPU sets the driving frequency to a frequency for low speed drive. On that occasion, the driving frequency is normally set at a predetermined frequency higher than the resonance frequency or set so as to be gradually shifted to the high frequency side and be swept up to a predetermined frequency.

Then the CPU monitors the output from the vibration detecting means 3 and estimates the overrun amount at the stop operation according to a stop sequence of changing the phase and amplitude of the AC voltages.

Then the CPU sets a new target position at a position the estimated overrun amount before the old target position (S44), and this state continues before the position of the moving member agrees with the new target position (S45). This operation of estimating the overrun amount is continuously carried out up to the start of the stop operation.

When the position of the moving member reaches the new target position, the internal timer in the CPU 11 is set so as to advance the phase of the voltage applied to the piezoelectric element 1 by 90° (S46). Then the AC voltages with a phase lead of 90° are applied until the amplitude detected by the vibration detecting means 3 becomes smaller than the predetermined amplitude (S47). When the amplitude reaches the predetermined amplitude, the outputs of the four-phase pulse signals are fixed at the same level (S48) to set the voltages applied to the piezoelectric elements 1, 2 to 0.

Figure 12:
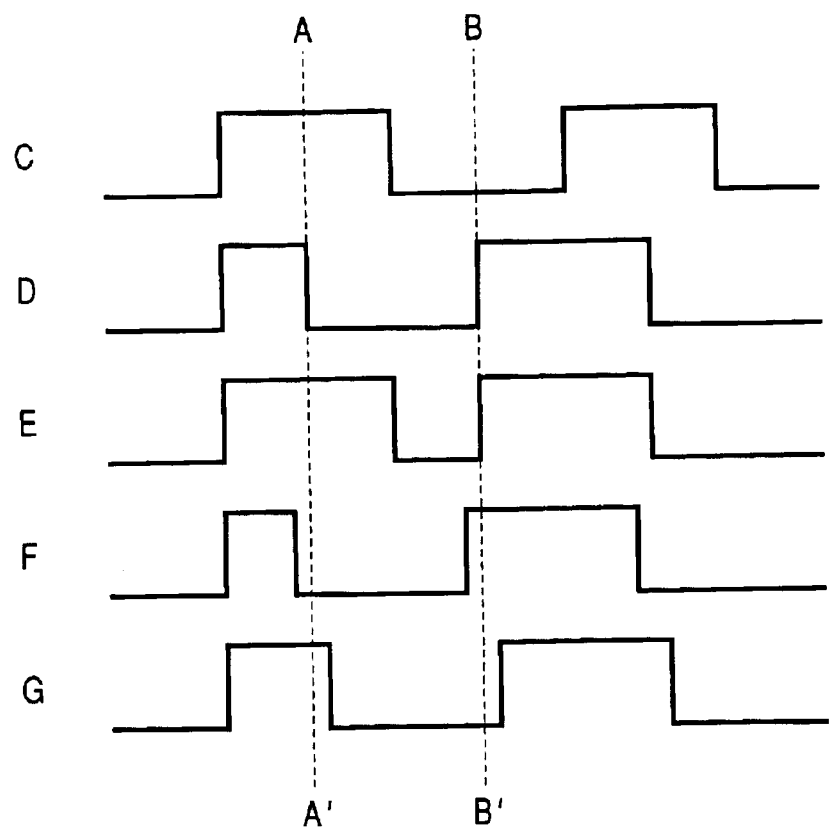
FIG. 12 is a timing chart illustrating changes of phases of pulse signals.

FIG. 12 shows an operation of advancing the phase of a pulse signal by 90°. The signal C indicates the original waveform (the waveform in normal driving).

If the actual position becomes equal to the foregoing new target position at a point before the point A–A' the signal is changed to the signal D.

However, since it is impossible to advance the phase by 90° like the signal D after the point A–A' the pulse edge is shifted to the next phase change point B–B' after the point A–A' so that the signal becomes like the signal E.

In the case where the actual position becomes equal to the new target position around the point A–A' the vibration damping effect will appear even with a slight shift from 90° like the signals F and G if it is close to the point A–A'.

Concerning the estimation of the overrun amount, since the overrun amount is approximately proportional to the square of the moving velocity immediately before the start of the stop, the overrun amount can be readily calculated from the moving velocity if a coefficient of the proportional relation is preliminarily determined.

(Sixth Embodiment)

Figure 13:
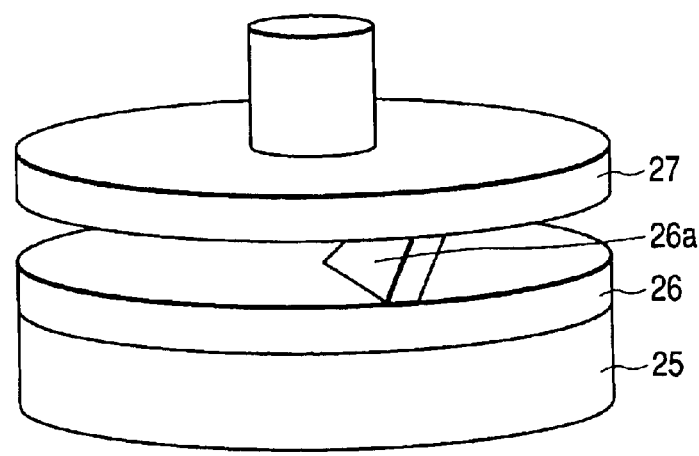
FIG. 13 is an illustration showing the structure of the vibration type actuator in the sixth embodiment.

FIG. 13 is an illustration showing a configuration example of the vibration type actuator of the standing wave type rotated by an AC voltage of one phase in the sixth embodiment of the present invention.

In FIG. 13, numeral 25 designates a stacked piezoelectric element, numeral 26 designates an elastic body comprised of an elastic member, and numeral 27 designates a moving member. When an AC voltage is applied to the piezoelectric element 25, the elastic member 26 vibrates vertically, whereby the moving member 27, which is pressed by unrepresented pressing means against a projection 26a mounted obliquely relative to the direction of the rotor shaft on the elastic member 26, starts rotating in one direction.

In the vibration type actuator rotated by an AC voltage of one phase, as described above, it is clear that quick damping control on the amplitude of the vibration of the vibration member can be attained by controlling the phase of the AC voltage applied to the piezoelectric element 25.

The vibration type actuator of the configuration of the present embodiment can also be constructed, for example, as in the embodiment shown in FIG. 10, so as to be applied to the structure for driving a common load by a plurality of rotors.

What is claimed is:

1. A control apparatus for a vibration type actuator including a contact member in press contact with a vibration member having an electro-mechanical energy conversion element in which a driving alternating signal is applied to the electro-mechanical energy conversion element to generate driving vibration in the vibration member, thereby effecting relative movement between the vibration member and the contact member, said control apparatus comprising:

a detecting circuit that detects a vibration of the vibration member and outputs a corresponding signal; and a control circuit that detects a vibration of the vibration member and outputs a corresponding signal; and a control circuit that applies an excitation signal to the electro-mechanical energy conversion element in an operation of decelerating or reversing or stopping a relative movement between the vibration member and the contact member, the excitation signal being controlled so as to excite the vibration in the vibration member in a direction that cancels free vibration in the vibration member, according to the signal output from the detecting circuit, wherein in an operation of reversing a moving direction of the relative movement between the vibration member and the contact member, the moving direction is reversed after application of the excitation signal for a period of a predetermined time or a time determined according to a velocity or amplitude of the vibration immediately before a start of a stop operation.

* * * * *

UNITED STATES PATENT AND TRADEMARK OFFICE
CERTIFICATE OF CORRECTION

| | | |
|---|---|---|
| PATENT NO. | : 7,154,208 B2 | Page 1 of 1 |
| APPLICATION NO. | : 10/156056 | |
| DATED | : December 26, 2006 | |
| INVENTOR(S) | : Kataoka | |

It is certified that error appears in the above-identified patent and that said Letters Patent is hereby corrected as shown below:

COLUMN 1:
Line 57, "is" should be deleted.

COLUMN 14:
Lines 33 and 34 should be deleted.

Signed and Sealed this

Third Day of February, 2009

JOHN DOLL
*Acting Director of the United States Patent and Trademark Office*